March 17, 1964 R. E. JOHNSON 3,124,952
GAS CHROMATOGRAPH
Filed Sept. 23, 1960
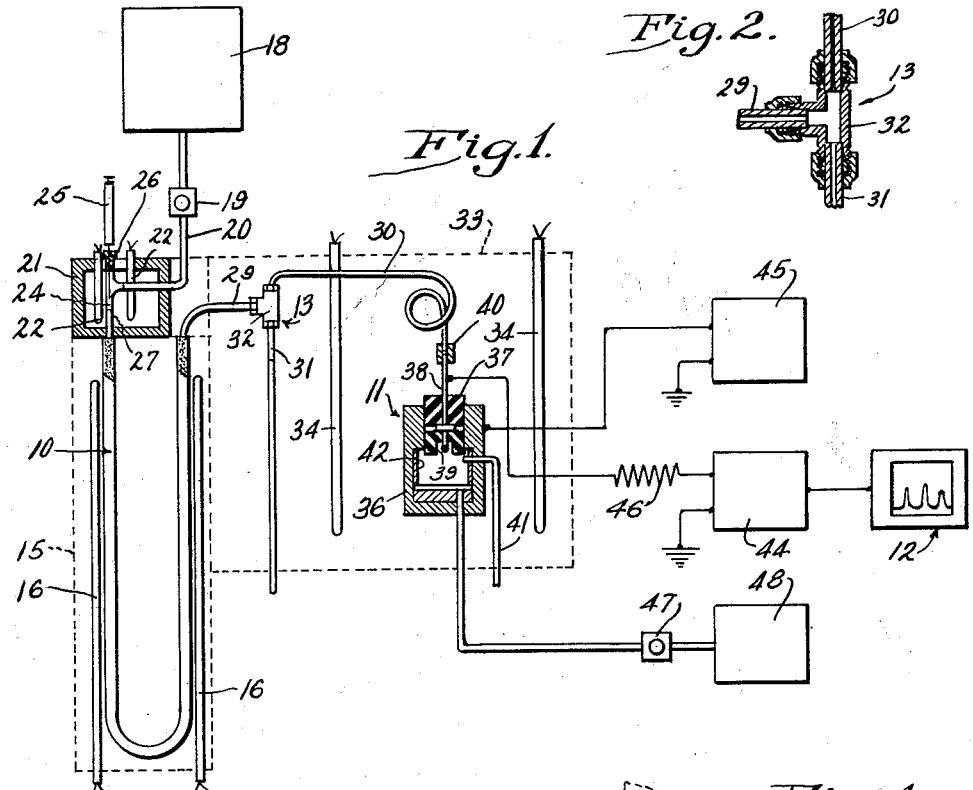
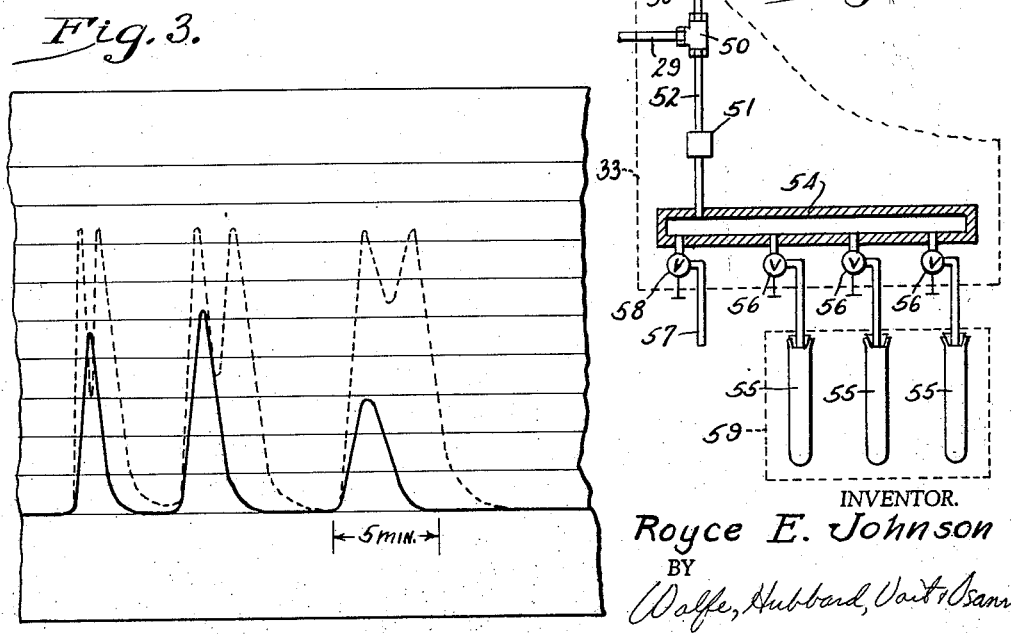
INVENTOR.
Royce E. Johnson
BY
Wolfe, Hubbard, Voit & Osann
ATTORNEYS United States Patent Office 3,124,952
Patented Mar. 17, 1964

3,124,952
GAS CHROMATOGRAPH
Royce E. Johnson, Rockford, Ill., assignor to Barber-Colman Company, Rockford, Ill., a corporation of Illinois
Filed Sept. 23, 1960, Ser. No. 58,043
1 Claim. (Cl. 73—23)

This invention relates to gas chromatography systems and more particularly to sample splitters for such systems.

With the advent of very high sensitivity ionization detectors in gas chromatography systems, quantitative analysis of the sample analyzed requires that the sample be very small to avoid loss of linearity of detector response. A substantially linear relationship between the quantity of each sample gas component in the detector at any instant and an output signal amplitude is required to relate the area under the curve plotting the signal against time to the quantity of such sample component. An overload in the form of too many sample gas molecules in an argon ionization type detector, for example, results in an output reading much too low to reflect the number of molecules.

Small sample sizes, however, introduce problems of their own, particularly where the sample is desirably measured in its normal liquid state prior to vaporization and subsequent separation in a chromatograph column. With packed column techniques a few microliters or less of a liquid sample are commonly introduced by a hypodermic syringe into the inlet passageway to the column for practically instantaneous vaporization and essentially simultaneous introduction of the vapor into the column. Accurate measurement and handling of such small volumes is difficult at best. Even such small amounts, however, are often too large to prevent overloading ionization detectors of the argon metastable atom type.

Resort has often been made to sample splitting after vaporization, and this invention is particularly directed to an improved method and apparatus for sample splitting. The volume of the vaporized sample is many times greater at the relatively low column inlet pressure than that of the liquid (or sometimes solid) sample and a volumetric division of the vapor so that only a known fraction of the sample enters the column might appear quite simple. However, analyses of the composition of the samples so split have varied with the amount of sample injected. Some of the difficulties have been traced to the transient pressure conditions existing after vaporization and others have been laid to the difference in boiling points of the respective components with a corresponding differential in the effectiveness of the splitting means for the different components.

Neither has accuracy and reliability been the only factor inhibiting reliance upon sample splitting as heretofore practiced. Many ingenious techniques have been exhibited by chromatographers in selecting and balancing quantities, temperatures, pressures and voltages, but the difficult situations remain where one end is served only at the expense of another. For example, a factor sometimes at odds with the small sample size requirement is the desirability of collecting the separated components in sufficient quantity for further tests.

Accordingly, it is an object of the invention to provide a gas chromatography system with a highly sensitive detector having improved linearity of response for analysis of samples of conveniently large size. More particularly it is an object of the invention to provide an improved sample splitter for gas chromatography systems in which available linearity of response of highly sensitive detectors is retained.

Still further objects include the provision of sample splitting means affording maximum effectiveness and convenience in utilizing relatively high volume chromatography columns with low volume detectors, the increase of versatility of chromatography systems by facilitating both qualitative and quantitative analysis including the collection of relatively large sample separations, and the maintenance of linearity in the splitting of the respective components of the sample.

Various objects and advantages will become apparent as the following detailed description proceeds taken together with the accompanying drawings in which:

FIGURE 1 is a semischematic representation of a gas chromatography system incorporating an effluent splitter;

FIG. 2 is a cross section diagram of a T fitting employed in the effluent splitter;

FIG. 3 is an exemplary chromatogram made on the apparatus of FIG. 1.

FIG. 4 illustrates a modification of the effluent splitter employed in the FIG. 1 system together with a collection system.

While the invention is described in connection with the preferred embodiment thereof it will be understood that the invention is not to be limited to the specification embodiment shown and described, and that the appended claim is intended to cover the various alternative and equivalent constructions within the spirit and scope of the invention.

Turning now to FIG. 1, a gas chromatography system shown therein has a packed column 10, an argon ionization detector 11 and a recording system 12, each of which major components is suitably of proven prior design and construction. They are described here for a fuller appreciation of their relation to the effluent sample splitter 13 in apparatus incorporating the invention.

The column 10, suitably made of glass or metal, is packed with particles coated with a stationary phase which absorbs and detains for different periods the respective gases of a mixture forced through the column. In order to maintain the column at a constant elevated temperature above the condensation point of any gases to be passed through it, the entire column is enclosed within a chamber 15 containing electrical heating elements 16. By way of illustration in an actual equipment represented in FIG. 1, in this instance, the U-shaped column is 9 feet long with an internal diameter of 5 millimeters (approximately $13/64''$), and is maintained at a temperature of 170° C. It is packed with 100 mesh, acid-washed particles of solids marketed for this purpose as siloxane treated Chromosorb W80. The stationary phase itself in this instance is an 8% acetone solution of diethylene glycol succinate which coats the surfaces of the packed solids. This is the gas-liquid partition type of column; gas-solid partitioning may also be employed.

A carrier gas from a pressurized gas supply source 18 conveys the sample gas mixture through the column. The carrier gas in this instance is argon and is available in tank form in sufficient purity. Drying means may also be desirable to avoid a water vapor response in the detector. A pressure regulator 19 maintains a constant gas input pressure to the column, which is suitably in this instance 20 pounds per square inch at normal room temperature. As shown in FIG. 1, the carrier gas tubing 20 passes through a flash heater chamber 21 containing the heater elements 22. The sample is introduced into the argon stream in a tubing portion, suitably a T tube fitting 24, within the flash heating chamber 21. With the chamber heated to 300° C., the liquid sample is immediately vaporized after injection.

Injection of a liquid sample is suitably provided by a manually operated hypodermic syringe 25 located outside the flash heater chamber 21. As shown in FIG. 1 the hollow needle of the syringe extends into the flash chamber and through a silicone rubber septum or plug 26 fitted into one arm of the tubing T 24. The carrier gas supply tubing 20 is coupled to the leg of the T and a further tubing section 27 is connected between the other arm of the T 23 and the inlet end of the column 10 to form a continuous gas passage. With the needle thrust into the upper arm far enough to open into the passage in the other or lower T arm, the sample when ejected is swept promptly into the gas stream.

In such an installation, an accurately metered liquid sample in the order of 1 to 10 microliters or more may be injected without appreciable selective evaporation of sample components from the needle. An exemplary sample, the analysis of which is indicated in the FIGURE 3 chromatogram which was run to demonstrate the operation of the equipment thus far described, was 5 microliters of the methyl esters of saturated straight-chain aliphatic fatty acids commonly identified by the number of carbon (C) atoms in each alkyl radical, in this case being acids C–8, 9, and 10 in different amounts to be determined by the analysis. While somewhat smaller amounts of such a sample can be injected by syringe, the desired ranges of detector signal amplitudes were in this case provided only by sample gas component amounts to the detector corresponding to liquid sample sizes very much smaller than permitted by available injection techniques. In this example the sample would be desirably reduced to approximately 0.03 microliter (about 1/150 of the 5 microliter sample).

In accordance with the invention the sample is not reduced to such an amount but instead the total effluent from the column 10 is split into two streams (which in this case have a 1 to 150 ratio). The effluent or outlet splitter 13 indicated in FIG. 1 employs an inlet tubing section 29, a detector outlet tubing section 30, and an adjustable by-pass tubing section 31. With the input tubing 29 connected to the leg of a tubing T 32, and the detector and by-pass outlet tubing sections 30 and 31 connected to the respective opposite arms or ends of the T, the division of gas flow between the outlet tubing sections is selected by adjusting the ratio of their gas flow resistances. Stainless steel tubing is suitably employed. The T fitting 32 itself is not relied upon to provide a significant portion of the flow resistance and its dimensions are not critical save that it should have relatively smooth, uniform bores, as indicated in the cross section diagram of FIG. 2. The T may suitably be made of brass and commercially available fittings such as the Swagelock tube T's marketed by Crawford Fitting Co. have been found satisfactory.

Several considerations are critical in the construction of an effluent splitting system capable of satisfactorily operating as such under the unusual conditions encountered in gas chromatography. First, the splitter must accurately maintain a fixed splitting ratio and second, the resolution of the separation of the gas components of the sample eluted from the column must be carefully maintained in at least the portion of the effluent directed to the detector. With this in mind, the detector tubing section 30 defines a small cross-sectional area orifice which is many times longer than its diameter. In the particular example discussed, 0.010 inch internal diameter tubing is employed. Inlet tubing and by-pass outlet tubing sections 29 and 31 are suitably of the same internal cross section diameter, being in this case stainless tubing having 0.040 inch internal diameter. It was found with such respective sizes of tubing a 4 inch length of by-pass outlet tubing 31 and a 36 inch length of detector outlet tubing 30 provided an approximately 150 to 1 volumetric split ratio. The exact lengths require experimental determination inasmuch as the internal diameters of commercially available tubing is subject to variation. As a rule of thumb, the ratios of the length and internal cross section area of tubing section 31 to the length and internal cross section area of tubing section 30 determines the splitting ratio for given internal diameter tubing. However, the lengths are preferably kept quite long in order to minimize criticality of length selection and avoid variations in the splitting ratio due to effects of gas velocity. Moderate static pressure at the column outlet also improves column performance in many instances. For convenience, the long section 30 of the detector tubing may be kept in coiled form. The entire splitter circuit is maintained at an elevated temperature in common with the detector 11 in a chamber 33 having heaters 34.

The use of a valve or other short orifice means which might cause turbulence of the gas or adversely affect the flow division or split ratio by venturi effects is avoided in the detector tubing 30. The tubing length 30 is preferably left constant, being coupled at its ends to the T 32 and detector 11. Adjustment of the split ratio is most easily made by selecting the length of by-pass tubing 31 which may suitably vent to the atmosphere or it may supply a fraction collecting system as in FIG. 4. In testing the splitter, the calibration is readily established by measuring the gas volumes discharged from the respective outlet tubing 31 and cell connecting tubing 30. No further metering during operation is called for.

With the sample splitter of the exemplary dimension described, a gas flow of 150 milliliters per minute, for example, results in a gas flow through the detector of only 1 milliliter per minute. Such a gas flow rate is particularly advantageous with such sensitive detectors as the argon ionization detector 11 illustrated in FIG. 1 which may be employed to detect from $10^{-11}$ to $10^{-15}$ moles of a component compound of the sample.

As shown in FIG. 1, the detector comprises a cathodic cylindrical cell body 36, suitably of stainless steel, whose open upper end is sealed by an insulating member 37, suitably of ceramic. A hollow tubular anode 38 extends through the insulator 37 to terminate within the cell. A bore 39 in the inner end of the insulator, approximately 1/4 inch deep by 1/4 inch in diameter, for example, defines a small inner chamber in the vicinity of the anode where the emerging organic or other sample component gas molecules are subjected to ionization. The upper end of the anode tubing member 38 is joined to the end of the splitter detector tubing member 30 by an insulating bushing 40 which electrically insulates the anode from the grounded splitter. The detector cell is vented to atmosphere through a tubing member 41 extending into the cell body 36 near the anode ionization chamber 39.

In the operation of detectors of this type, the atoms of the carrier gas, namely in argon in this instance, are excited to a metastable state, suitably by radiation. Such a radiation source may take the form of a band of radium-bearing foil 42 positioned around the inner surface of the cell body. Various ones of radioactive materials have been successfully employed. The metastable argon atoms in turn ionize the atoms of eluted gas which are components of this sample, providing the gas is one which is subject to this type of ionization. With the ionization cell connected in series with an amplifier 44 a D.C. voltage source 45 and a resistor 46, the ionization electron current is detected and amplified. The resistance 46 has a very high value in the order of tens or hundreds of megohms to help keep the response linear, and to limit overload current which may damage the amplifier. The amplifier output is connected to the recording system 12 to plot the variation of ionization current with time as shown in FIG. 3.

Scavenging techniques are also desirably employed to help make the most of the fast response time and the otherwise substantially linear response of the detector when employing the sample splitter. The scavenging gas, suitably argon, from a source 48 and suitably maintained by pressure regulator 47 at close to atmospheric pressure is introduced through the cap or bottom of the ionization cell. This gas flow results in the reduction of the time constant of the detector by rapidly conveying the sample gas molecules out of the cell. The ionization current thus varies substantially instantaneously with the change in gas composition as it leaves the anode. The scavenging gas is suitably vented to atmosphere along with the carrier gas and sample components through the vent tube 41.

Turning to the FIG. 3 chromatogram, several sample component peaks are shown, ionization current due to the sample components being plotted as the ordinate against time as the abscissa. Using the current reading in the flattened curve region between the component peaks as a zero reference, the area under a component curve is a measure of the absolute quantity of the corresponding eluted gas component. The double peaks shown in dotted outline show overloading of the detector by excessive amounts of gas as would result if the splitter were not employed. The area under such curves is not a significant measurement. It will also be noted that the midportions of the dotted curves occur later than the solid line curves, indicating the longer detector time constant involved when overly large numbers of the gas molecules are present in the ionization chamber and all the carrier gas from the column enters the ionization chamber.

In the operation of the system, the many variables are controlled or are adjusted in accordance with known techniques. The sample splitter ratio is selected relative to the various other parameters to provide curves of useful magnitude for the particular sample component being measured. The splitter system itself introduces a sometimes useful back pressure on the column. The extent of the back pressure can be adjusted independently of the splitting ratio as by controlling the length and inside diameter of connecting tubing 29. Similarly, the lengths of the splitter outlet tubing members 30 and 31 may be selected to change the back pressure of the column while maintaining the same ratio of flow resistance with respect to each other.

The relatively small proportion of the effluent useable in the detector may be less than the amounts which can be efficiently employed in such packed columns as that described. The separation of a larger sample than is detected does not, necessarily therefore, cause a loss of column efficiency. However, in those situations where it is desired to employ the column for preparative work, the bypassed effluent can be readily collected.

Reference is accordingly made to FIG. 4 which illustrates a modification of the sample splitter together with a collection system.

Referring first to the modification of the splitter itself, the splitter 50 shown therein incorporates an adjustable valve 51 in the by-pass line. Such a needle valve or other valve type capable of adjusting to a very small orifice, adds flow resistance to that of the by-pass tubing 52 when the valve orifice is decreased. By so varying the valve adjustment, and with a greater or lesser reliance upon the flow resistance of the by-pass tubing 52 as may be desired for particular installations, the split ratio may be easily adjusted without changing the length of the tubing. In such a splitter, however, the detector outlet tubing preferably remains as a very long, small-diameter tubing construction for providing high flow resistance with a minimum of diffusion.

As further shown in FIG. 4, a sampling manifold 54 is suitably connected below the valve 51 to receive the gas flow. A number of collecting bottles or tubes 55 are shown in this instance, each one being connected through its own cut-off valve 56 to the manifold. The manifold is also vented to atmosphere through an outlet tubing or other outlet means 57 controlled by a cut-off valve 58.

In operation of the collection system of FIG. 4 the vent valve 58 remains open until such time as a component of the gas is to be collected. At that time, as may be derived from the reading of the recorder 12, one of the manifold cut-off valves 56 is opened and the vent valve 58 is closed so that whatever sample component has reached the manifold at that time flows into the selected bottle 55. The valves 56 are thus selectively opened and closed for collecting different partitions of the sample. Back pressure variations in the splitter which would affect the proportion of the gas supplied to the detector is avoided during a quantitative recording by always keeping open either valve 58 or one of the valves 56. Collection of volatile components is facilitated by immersing the bottles or tubes 55 within a condensation chamber 59 which may be suitably a container carrying liquid nitrogen or other refrigerant.

I claim as my invention:

A gas chromatography apparatus comprising a partitioning column, means for supplying a stream of carrier gas under pressure to the inlet end of the column, means for injecting and vaporizing a measured quantity of a liquid sample in the carrier gas stream at the inlet end of the column, and means for splitting the effluent gases from the column into two precisely proportioned streams, means for supplying one of said streams through a small-volume ionization detector, means for recording the change of ionization current with time elapsing as said one stream flows through the detector, and means for supplying the other of said streams to a collector.

References Cited in the file of this patent

UNITED STATES PATENTS 3,056,278     Guenther _____ Oct. 2, 1962

OTHER REFERENCES

Article by Lovelock in Journal of Chromatography, vol. 1, page 35, 1958.

Article by Lipsky et al. in Analytical Chemistry, vol. 31, No. 5, May 1959, page 852.

Article by Condon in Analytical Chemistry, vol. 31, No. 10, October 1959, pages 1717–1722.

Article by Wet et al. in Analytical Chemistry, vol. 32, No. 2, February 1960, pages 169–174.